United States Patent
Mukasa (10) Patent No.: US 6,707,971 B2
(45) Date of Patent: Mar. 16, 2004

(54) DISPERSION MANAGEMENT OPTICAL TRANSMISSION SYSTEM AND OPTICAL TRANSMISSION LINE

(75) Inventor: Kazunori Mukasa, Chiba (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 124 days.

(21) Appl. No.: 10/117,170

(22) Filed: Apr. 8, 2002

(65) Prior Publication Data

US 2003/0007737 A1 Jan. 9, 2003

(30) Foreign Application Priority Data

Apr. 13, 2001 (JP) .......................... 2001-115943
Jan. 29, 2002 (JP) .......................... 2002-020683

(51) Int. Cl.[7] .......................... G02B 6/18; G02B 6/22; H04B 10/12
(52) U.S. Cl. .................. 385/50; 385/123; 385/124; 385/127; 398/148
(58) Field of Search .................. 385/50, 122–124, 385/126–128; 398/147, 148

(56) References Cited

U.S. PATENT DOCUMENTS

| | | | | |
|---|---|---|---|---|
| 6,421,490 B1 | * | 7/2002 | Liu | ............... 385/127 |
| 6,600,862 B2 | * | 7/2003 | Mukasa | ............ 385/124 |
| 2001/0021298 A1 | | 9/2001 | Mukasa | |
| 2002/0012509 A1 | | 1/2002 | Mukasa | |

FOREIGN PATENT DOCUMENTS

| | | |
|---|---|---|
| JP | 8-42102 | 2/1996 |
| JP | 9-211511 | 8/1997 |

OTHER PUBLICATIONS

K. Mukasa, et al., ECOC 97, Conference Publication No. 448, vol. 1, pp. 127–130, "Novel Network Fiber to Manage Dispersion at 1.55μm with Combination of 1.3μm Zero Dispersion Single Mode Fiber", Sep. 22–25, 1997.

* cited by examiner

Primary Examiner—Hemang Sanghavi
Assistant Examiner—Omar Rojas
(74) Attorney, Agent, or Firm—Oblon, Spivak, McClelland, Maier & Neustadt, P.C.

(57) ABSTRACT

A dispersion management optical transmission system obtained by connecting a positive fiber having a positive dispersion in the 1.5 μm band and a negative fiber having a negative dispersion, suppressing dispersion in the 1.5 μm band, suppressing the occurrence of non-linear phenomena, and reducing the transmission loss and an optical transmission line using the same, wherein the dispersion of the positive fiber in the 1.55 μm band is 8 to 15 ps/nm/km and the dispersion slope is at least 0.04 ps/nm²/km, the dispersion of the negative fiber in the 1.55 μm band is not more than −40 ps/nm/km and the dispersion slope is not more than −0.08 ps/nm²/km, the cumulative dispersion of the positive fiber is at least 200 ps/nm, and the average dispersion when combining the positive fiber and the negative fiber module is suppressed to any wavelength region of the 1.5 μm band.

15 Claims, 4 Drawing Sheets

DISPERSION MANAGEMENT OPTICAL TRANSMISSION SYSTEM AND OPTICAL TRANSMISSION LINE

BACKGROUND OF THE INVENTION

1. Field of the Invention

The present invention relates to a dispersion management optical transmission system and optical transmission line, more particularly relates to a dispersion management optical transmission system for high speed wavelength division multiplexing (WDM) transmission and a WDM optical transmission line comprising that dispersion management optical transmission system (optical fiber).

2. Description of the Related Art

With optical transmission becoming faster in speed and greater in capacity, WDM transmission is being looked at closely as a mainstream technology.

The new problem of non-linear phenomena due to the higher power of optical signals and the interaction between signal wavelengths has arisen, however.

Among the non-linear phenomena, four wave mixing (FWM) has a serious effect at the time of WDM transmission. Methods to suppress it are being actively studied.

FWM easily occurs in region of small dispersion, so a small dispersion fiber is known to be disadvantageous in that point. Even the conventionally used non-zero dispersion shift fiber (NZ–DSF) has been insufficient in this regard.

Further, the waveform distortion due to self-phase modulation (SPM) or cross-phase modulation (XPM) etc. is also a serious problem. In the research to solve this, along with studies to keep down the non-linear refractive index ($n_2$) reported in OFC' 97 TuN1b etc., the enlargement of the effective core area ($A_{eff}$) is extremely interesting.

The distortion $\phi_{NL}$ of a signal due to non-linear phenomena is generally expressed by the following formula (1):

$$\phi_{NL}=(2\pi \cdot n_2 \cdot L_{eff} \cdot P)/(\lambda \cdot A_{eff}) \qquad (1)$$

where, $n_2$ ($m^2/W$): non-linear refractive index,
$L_{eff}$ (m): effective length,
P (W): power,
$\lambda$ (nm): wavelength, and
$A_{eff}$ ($\mu m^2$): effective core area.

From formula (1), it is learned that it is advantageous that the effective core area ($A_{eff}$) be large.

As reported in OFC'96 WK15 or OFC' 97 TuN2, the enlargement of the effective core area ($A_{eff}$) is one of the most sought after features.

Enlargement of the effective core area ($A_{eff}$), however, is known to easily cause problems such as an increase in the bending loss or an increase in the dispersion slope in a fiber of a type such as the conventional NZ–DSF used for forming a transmission line by itself. This is also a problem in NZ–DSF types.

To solve the above problems, it is reported that the method of managing the dispersion for the line as a whole is effective.

For example, Japanese Unexamined Patent Publication (Kokai) No. 9-211511 discloses to obtain an optimal line by connecting two fibers of opposite positive and negative dispersions in the order of the less non-linear (smaller $n_2/A_{eff}$) fiber and the more non-linear (larger $n_2/A_{eff}$) fiber.

As a specific example, as shown in ECOC' 97 vol. 1, p. 127, it is proposed to use a combination of a single mode optical fiber (SMF) having positive dispersion characteristics and a dispersion compensation optical fiber (DCF) having negative dispersion characteristics.

A 1.31 zero-dispersion single mode optical fiber, that is, a fiber having zero dispersion at a wavelength of 1.31 $\mu$m, has very superior properties in the points of the non-linearity and transmission loss, but has a large positive dispersion and dispersion slope at a wavelength of the 1.55 $\mu$m band. With this SMF alone, it is not possible to transmit light of the 1.55 $\mu$m band without dispersion, so compensation of the dispersion becomes necessary and therefore a DCF having the above negative dispersion characteristic is combined.

Such a DCF is connected with the SMF and used as a line rather than the conventional modular type dispersion compensation fiber, so is called a "line use dispersion compensation fiber". Further, it has a negative dispersion (reverse dispersion), so is called a "reverse dispersion fiber (RDF)".

The above SMF and RDF are managed to obtain a zero dispersion in total in the 1.5 $\mu$m band, but each fiber has a large dispersion of about 16 to 22 ps/nm/km in absolute value in the 1.5 $\mu$m band. This is advantageous in terms of suppressing FWM.

Further, an RDF is a fiber designed to cancel out the dispersion and dispersion slope of an SMF and can therefore achieve a dispersion flatness suitable for WDM transmission in the line as a whole.

The dispersion compensation performance when connecting an SMF and RDF can be easily understood by expression by the compensation rate CR shown by the following formula (2) for example:

$$CR(\%)=[(\text{Slope}_{RDF}/\text{Slope}_{SMF})/(\text{Dispersion}_{RDF}/\text{Dispersion}_{SMF})]\times 100 \qquad (2)$$

In formula (2), "$\text{Slope}_{RDF}$" indicates the dispersion slope (ps/nm²/km) of the RDF, "$\text{Slope}_{SMF}$" indicates the dispersion slope (ps/nm²/km) of the SMF, "$\text{Dispersion}_{RDF}$" indicates the dispersion (ps/nm/km) of the RDF, and "$\text{Dispersion}_{SMF}$" indicates the dispersion of the SMF.

From formula (2), the nearer the compensation rate CR to 100%, in the wider wavelength range zero dispersion can be realized. That is, the closer the dispersion per slope (DPS) values of the SMF and RDF, the lower the dispersion slope obtained. The RDF has a high compensation characteristic of a DPS of about 300 (nm).

However, an RDF or other dispersion compensation type fiber has a larger non-linearity than an SMF etc., so when connecting an SMF and RDF by a ratio (length ratio) of 1:1, relatively large power is incident into the RDF and XPM and other non-linear phenomena can no longer be avoided.

Therefore, recently, as shown in OECC' 9815C1-3, attempts have been made to shorten the ratio of connection of the RDF to SMF and suppress the non-linear phenomena by connecting an SMF having a dispersion value of 16 to 22 ps/nm/km and a high dispersion RDF having a larger absolute value of dispersion than the SMF. In such a combination, however, the total characteristics end up deteriorating compared with a conventional NZ–DSF In this way, NZ–DSF and SMF+RDF system suffer from above problems.

SUMMARY OF THE INVENTION

An object of the present invention is to provide a dispersion management optical transmission system suppressing the occurrence of non-linear phenomena and reducing the transmission loss and an optical transmission line using the same.

According to a first aspect of the present invention, there is provided a dispersion management optical transmission system comprising a first optical fiber having a positive dispersion and a positive dispersion slope in the 1.5 μm band and a second optical fiber or a second optical fiber module connected to a rear side of the first optical fiber and having a negative dispersion and a negative dispersion slope in the 1.5 μm band, the dispersion of the first optical fiber in the 1.55 μm band being 8 to 15 ps/nm/km and the dispersion slope being at least 0.04 ps/nm²/km, the dispersion of the second optical fiber or the second optical fiber module in the 1.55 μm band being not more than −40 ps/nm/km and the dispersion slope being not more than −0.08 ps/nm²/km, the cumulative dispersion of the first optical fiber being at least 200 ps/nm, and the cumulative dispersion when combining the first optical fiber and the second optical fiber or second optical fiber module being suppressed in any wavelength region of the 1.5 μm band.

Here, a "1.5 μm band" is for example a range of wavelength of 1.45 to 1.65 μm.

Preferably, the average dispersion when combining the first optical fiber and the second optical fiber or second optical fiber module is within ±3 ps/nm/km at any wavelength region of the 1.5 μm band.

More preferably, the length of the first optical fiber is at least four times the length of the second optical fiber or the second optical fiber module.

Still more preferably, a transmission loss of the first optical fiber in the 1.55 μm band is not more than 0.21 dB/km, a transmission loss of the second optical fiber or the second optical fiber module in the 1.55 μm band is not more than 0.50 dB/km, and a total transmission loss in the 1.55 μm band when combining the first optical fiber and the second optical fiber or second optical fiber module, excluding a connection loss, is not more than 0.300 dB/km.

Alternatively, a transmission loss of the first optical fiber in the 1.55 μm band is not more than 0.20 dB/km, a transmission loss of the second optical fiber or the second optical fiber module in the 1.55 μm band is not more than 0.27 dB/km, and a total transmission loss in the 1.55 μm band when combining the first optical fiber and the second optical fiber or second optical fiber module, excluding a connection loss, is not more than 0.215 dB/km.

Still more preferably, the dispersion slope in the 1.55 μm band when combining the first optical fiber and the second optical fiber or second optical fiber module is −0.030 to 0.030 ps/nm/m²/km.

Still more preferably, the effective core area ($A_{eff}$) of the first optical fiber is at least 70 μm².

Alternatively, the effective core area ($A_{eff}$) of the first optical fiber is at least 90 μm².

Still more preferably, the effective core area ($A_{eff}$) of the second optical fiber or second optical fiber module is at least 20 μm².

Still more preferably, the bending loss at a diameter of 20 mm of the second optical fiber or second optical fiber module in the 1.55 μm band is not more than 5 dB/m.

Still more preferably, the first optical fiber is configured having a core and a cladding, the core having a center core which has a refractive index higher than the cladding, and a side core formed around the outer circumference of the center core and having a refractive index between a refractive index of the center core and a refractive index of the cladding.

Still more preferably, the second optical fiber or second optical fiber module is configured having a core and a cladding, the core having a center core which has a refractive index higher than the cladding, a first side core formed around the outer circumference of the center core and having a refractive index lower than the cladding, and a second side core formed around the outer circumference of the first side core and having a refractive index higher than a refractive index of the cladding.

Still more preferably, in the second optical fiber or second optical fiber module, a relative refractive index difference (Δ1) of the center core with respect to the cladding is 1.2 to 1.5%, a parameter a at the time of approximation by the following formula (3) for a refractive index profile (n(r)) of the center core and a distance r from the center of the optical fiber being 2 to 5, $$n(r) \propto \left\{ 1 - 2\Delta\left(\frac{r}{a}\right)^\alpha \right\}$$

where, a is the center core radius and
Δ is $(n_1-n_2)/n_1$ ($n_1$ is the maximum refractive index of the center core, while $n_2$ is the refractive index of the cladding) a relative refractive index difference (Δ2) of the first side core with respect to the cladding is −0.50 to −0.35%, a relative refractive index difference (Δ3) of the second side core with respect to the cladding is 0.15 to 0.30%, and a ratio of the center core radius (a): first side core radius (b): second side core radius (c) is 1:1.7 to 2.0:2.4 to 3.0.

According to a second aspect of the present invention, there is provided an optical transmission line provided with at least one of any of the above dispersion management optical transmission systems.

According to a third aspect of the present invention, there is provided an optical transmission line provided with a plurality of any of the above dispersion management optical transmission systems.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Preferred embodiments of the present invention will be described in detail below while referring to the attached figures.

Figure 1A:
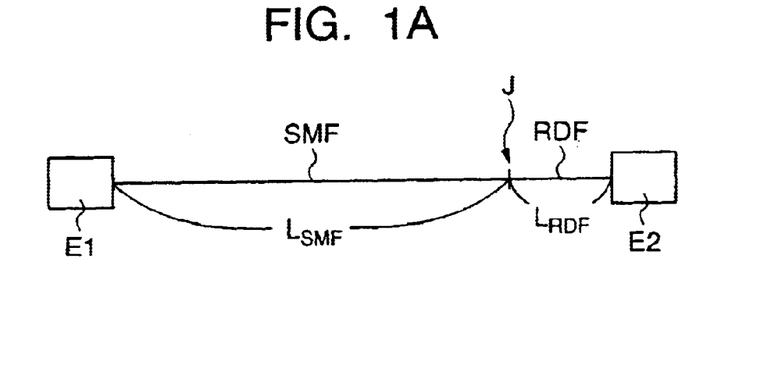
FIG. 1A is a schematic view of the configuration of a dispersion management optical transmission system according to an embodiment of the present invention.

FIG. 1A is a schematic view of the configuration of a dispersion management optical transmission system (optical fiber) according to a first embodiment.

A single mode optical fiber (SMF) having a positive dispersion and a positive dispersion slope in the 1.5 μm band (first optical fiber, also called a "positive fiber" below) is connected to an input part E1 of an optical signal generator or an optical amplifier having a not shown input means, a line use dispersion compensation optical fiber (RDF) having a negative dispersion and a negative dispersion slope in the 1.5 μm band (second optical fiber, also called a "negative fiber" below) is connected to the rear side of the SMF at a connection point J, and the other end is connected to an output part E2 of an optical signal receiver or optical amplifier having a not shown output means.

The SMF has a dispersion in the 1.55 μm band of 8 to 15 ps/nm/km and a dispersion slope of at least 0.04 ps/nm$^2$/km.

Further, the RDF has a dispersion in the 1.55 μm band of not more than −40 ps/nm/km and a dispersion slope of not more than −0.08 ps/nm$^2$/km.

Here, the SMF is used for long distance transmission until the cumulative dispersion over its length $L_{SMF}$ becomes at least 200 ps/nm, then the RDF is connected to its rear. The length $L_{SMF}$ of the SMF and the length $L_{RDF}$ of the RDF are suitably adjusted so that the average dispersion when combining the SMF and RDF is kept down to within ±3 ps/nm/km in any wavelength region of the 1.5 μm band.

Here, the length $L_{SMF}$ of the SMF is preferably set to be at least four times the length $L_{RDF}$ of the RDF.

Further, the dispersion slope in the 1.55 μm band when combining the SMF and RDF by the above configuration is preferably kept down to a range of −0.030 to 0.030 ps/nm$^2$/km.

Figure 1B:
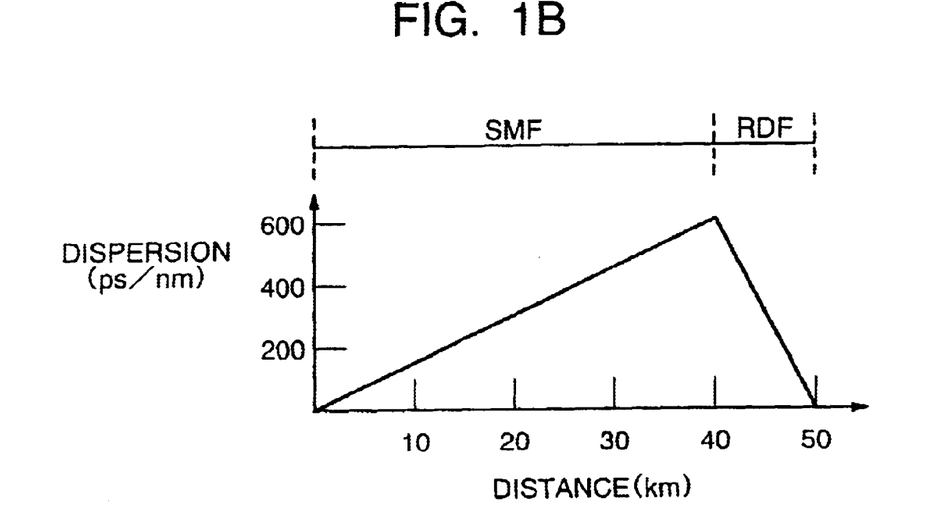
FIG. 1B is an example of a dispersion map of the dispersion management optical transmission system of the above configuration.

FIG. 1B is an example of a dispersion map of a dispersion management optical transmission system of the above configuration.

For example, when the dispersion of the SMF is 15 ps/nm/km and the dispersion of the RDF is −60 ps/nm/km, the length of the SMF is made 40 km to make the cumulative dispersion of the SMF portion 600 ps/nm and the length of the RDF portion is made 10 km to give a cumulative dispersion of −600 ps/nm. Due to this, the average dispersion when combining the SMF and RDF is within ±3 ps/nm/km in any wavelength region in the 1.5 μm band and the total length of the dispersion management optical transmission system becomes 50 km.

It is also possible to construct a dispersion management optical transmission system of a desired length by serially connecting units of the dispersion management optical transmission system of the above configuration.

Further, it is also possible to arrange more than one dispersion management optical transmission system in parallel to construct a desired optical transmission line.

A conventional SMF has a dispersion of at least 16 ps/nm/km in the 1.55 μm band.

Therefore, if trying to make the ratio of length of the RDF 15% (for example, in the case of a 50 km transmission line, 7.5 km) so as to sufficiently suppress the non-linear phenomena of the RDF, when the dispersion of the SMF is for example 18 ps/nm/km, the absolute value of the dispersion of the RDF in the 1.55 μm band must be made 100 ps/nm/km or about 5.5 times the absolute value of dispersion of the SMF.

If the dispersion becomes −100 ps/nm/km, the structure becomes close to that of a modular dispersion compensation fiber DCF. Such a DCF generally has a large $\Delta_+$, so the effective core area ($A_{eff}$) becomes small and further the non-linear refractive index ($n_2$) becomes large. Therefore, non-linear phenomena occur very easily.

Further in many case, the transmission loss and the polarization mode dispersion (PMD) result in relative large values that the transmission loss is 0.3 dB/km or more, and the PMD is 0.2 ps/√km or more.

Therefore, the total transmission characteristics end up deteriorating when combining the SMF and RDF.

In a dispersion management optical transmission system of the present embodiment, as the front fiber, use is made of a fiber of a type suppressing the dispersion value at 1.55 μm to 8 to 15 ps/nm/km or lower than that of a conventional SMF. Note that the absolute value of the dispersion is made at least 8 ps/nm/km so as to completely suppress the problem of occurrence of FWM.

When using the above SMF, if trying to make the ratio of the rear RDF 15% in the same way as above, even if the dispersion value of the SMF is 15 ps/nm/km, the dispersion value required for the RDF can be eased to more than −83 ps/nm/km or so, that is, about 5.5 times −15 ps/nm/km.

In general, reducing the absolute value of the dispersion of the RDF increases the freedom of design, so reducing the absolute value of dispersion of the RDF in the above way enables the transmission loss to be kept low.

Accordingly, an SMF having a dispersion value in the 1.55 μm band of about 8 to 15 ps/nm/km is used for long distance transmission until reaching a cumulative dispersion of at least 200 ps/nm, then for example an RDF having a dispersion value in the 1.55 μm band of −40 to −85 ps/nm/km is connected to its rear to compensate for the dispersion.

In the dispersion management optical transmission system shown in FIG. 1B, both the positive dispersion fiber and the negative dispersion fiber of the system are assumed to be comprised by lines, but the negative dispersion fiber may also be modularized like a DCF if the bending loss is sufficiently a small one of less than 3 dB/km or so at 20 mmφ.

Of course, even if optimizing the connection ratio by dispersion design, if the transmission loss of the optical fiber itself is large, it no longer becomes possible to keep the total transmission loss of the combination of the SMF and RDF to a small value.

Therefore, the transmission loss of the SMF is made not more than 0.21 dB/km, preferably 0.20 dB/km, and the transmission loss of the RDF is made not more than 0.50 dB/km, preferably 0.27 dB/km.

When the dispersion of the SMF is 14 ps/nm/km and the transmission loss is 0.19 dB/km and the dispersion of the RDF is −56 ps/nm/km and the transmission loss is 0.26 dB/km, the total transmission loss becomes about 0.204 dB/km. This can be said to an extremely low loss characteristic compared with a conventional NZ–DSF.

Further, the SMF (positive fiber) generally has a positive dispersion slope, so it is preferable to give a negative dispersion slope to the RDF (negative fiber).

By doing this, locally, there are large dispersions and dispersion slopes, but the dispersions and dispersion slopes cancel each other out and flat dispersion characteristics are obtained at the output side.

For example, even a dispersion slope of not more than 0.03 ps/nm$^2$/km, which was hard to achieve in a conventional NZ–DSF, is easily achieved in a total line combining positive and negative fibers.

As the positive fiber having a positive dispersion and a positive dispersion slope, a conventional single-layer structure SMF is known, but with a single-layer structure SMF, the dispersion value ends up becoming large or the $A_{eff}$ is hard to enlarge.

Therefore, it is preferable to use a fiber having a step-type refractive index profile or a refractive index profile structure based on a step type as disclosed in for example Japanese Patent Application No. 11-234767.

By doing this, it is possible to for example enlarge the $A_{eff}$ to 70 $\mu m^2$ or over, larger than an SMF of a conventional single-layer structure, more preferably over 90 $\mu m^2$, while keeping the dispersion value to 8 to 15 ps/nm/km.

A fiber having the above step-like refractive index profile or refractive index profile based on a step-type can achieve the characteristics of a dispersion of 8 to 15 ps/nm/km and an $A_{eff}$ of 70 $\mu m^2$ or more by a center core having a relative refractive index difference of one of about the conventional SMF or lower (about 0.4%).

The above structure is nothing special. It is a relative simple, often used two-layer structure. In such a structure, the transmission loss characteristic is generally largely dependent on the relative refractive index difference of the center core, so the structure can be expected to have extremely low loss characteristics.

Since the bending loss characteristic has a large effect on the loss characteristics, however, in a fiber having the above step-like refractive index profile or refractive index profile based on a step-type, the bending loss characteristic is preferably one where the transmission loss becomes 0.21 dB/km or less (preferably 0.20 dB/km or less).

Of course, the positive dispersion fiber is not limited to one of the above structure and may have other profiles as well such as one having an $A_{eff}$ of not more than 90 $\mu m^2$ and a dispersion value of not more than 10 ps/nm/km (however more than 8 ps/nm/km) stressing a reduction of the dispersion value, or a three-layer structure shown in the later mentioned FIG. 4.

To satisfy the above conditions, for example, it is possible to use the SMF described below.

Figure 2A:
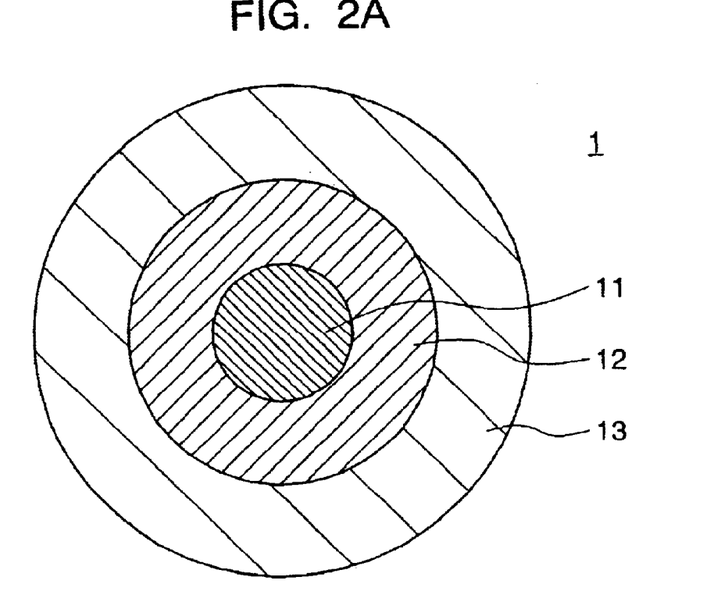
FIG. 2A is an example of a cross sectional view of a single mode optical fiber having a positive dispersion and a positive dispersion slope in the 1.5 μm band.

FIG. 2A is a sectional view of an SMF (1) having a positive dispersion and a positive dispersion slope in the 1.5 $\mu m$ band.

A side core 12 is formed around the outer circumference of the center core 11 and a cladding 13 is formed around the outer circumference of the side core.

Figure 2B:
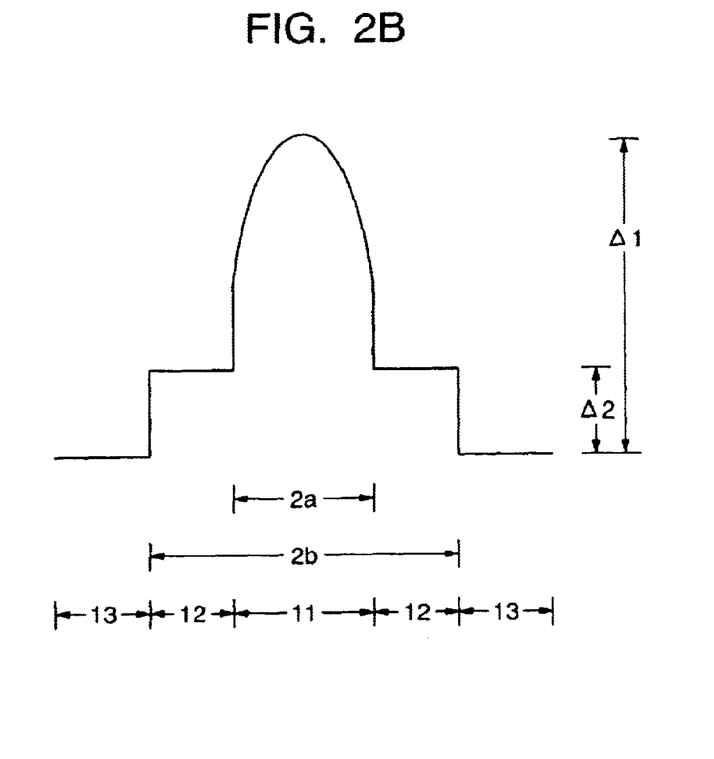
FIG. 2B is a refractive index profile corresponding to the above parts.

FIG. 2B is the refractive index profile corresponding to the above parts.

The center core 11 has a relative refractive index difference Δ1 with respect to the cladding 13; while the side core 12 has a relative refractive index difference Δ2 with respect to the cladding. The distribution of refractive indexes (relative refractive index distribution) forms a so-called step-like shape.

For example, the relative refractive index difference Δ1 is 0.40%, while the relative refractive index difference Δ2 is 0.20%.

Further, the parameter α in approximation by the following formula (4) of the refractive index profile (n(r)) of the center core and the distance r from the center of the optical fiber is about 4:

$$n(r) \propto \left\{ 1 - 2\Delta\left(\frac{r}{a}\right)^\alpha \right\} \quad (4)$$

where, a is the center core radius and

Δ is $(n_1-n_2)/n_1$ ($n_1$ is the maximum refractive index of the center core, while $n_2$ is the refractive index of the cladding).

Further, the ratio Ra of the diameter 2a of the center core 11 with respect to the diameter 2b of the side core 12 is for example 0.45 or so.

Further, the effective core area ($A_{eff}$) of the SMF is for example at least 70 $\mu m^2$, preferably at least 90 $\mu m^2$.

In an SMF of the above configuration, the Δ1, Δ2, α, 2a, 2b, $A_{eff}$, and other parameters can be suitably adjusted so that the dispersion in the 1.55 $\mu m$ band becomes 8 to 15 ps/nm/km and the dispersion slope becomes at least 0.04 ps/nm$^2$/km (for example, 0.06 to 0.07 ps/nm$^2$/km)

On the other hand, as the negative fiber having a negative dispersion and negative dispersion slope, a DCF used as a module had been studied in the past, but for use as an optical transmission system, there are problems in the non-linear characteristics, transmission loss, PMD characteristics, etc.

Further, recently, a line use dispersion compensation fiber called an "RDF" has been proposed, but generally its dispersion value is small, so there is the problem that non-linear phenomena easily occur due to the relatively large signal light power.

As the RDF (negative fiber) in this embodiment, it is possible to use a fiber optimized based on a fiber using a side core layer having the effect of suppressing enlargement of dispersion and increase of bending loss, that is, a W-shape, plus one additional side core so as to keep the bending loss at a diameter of 20 mm not more than 5 dB/m.

Even a system which gives the greatest emphasis to shortening the length of the negative fiber and where the transmission loss ends up becoming further larger (however, not more than 0.50 dB/km), but, instead, using a negative fiber having a large absolute value of dispersion, such as the case of use in for example a module, is completely in line with the intent of the present invention.

Next, the optimized design will be provided assuming the case of use for a line.

Figure 3:
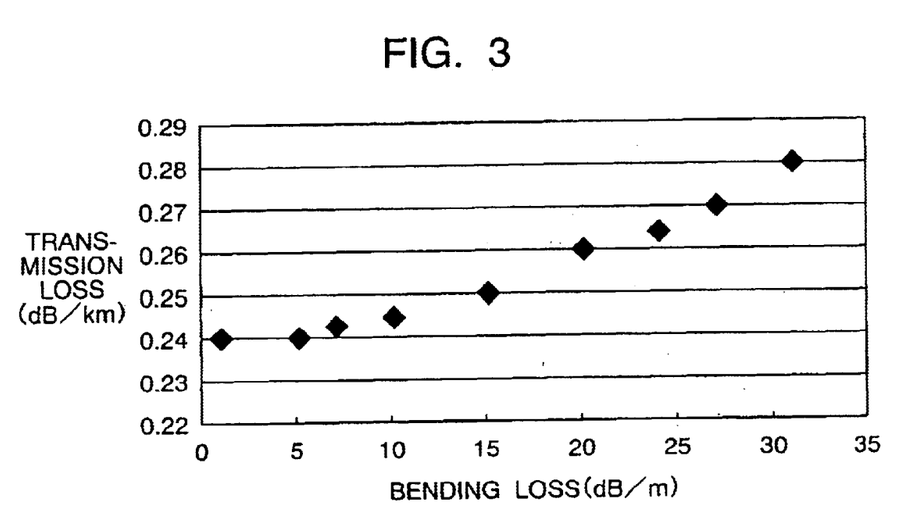
FIG. 3 is a view of transmission loss characteristics when changing the conventional type RDF profile to change the bending loss.

FIG. 3 shows the changes in the transmission loss characteristic when changing the profile of a conventional RDF to change the bending loss.

From the figure, it is learned that to achieve a low transmission loss, for example, the bending loss characteristic at a diameter of 20 mm has to be held to not more than 5 dB/m In the W-type profile such as used in the conventional RDF, however, if trying to achieve a low bending loss characteristic of not more than 5 dB/m at a diameter of 20 mm for example, either the dispersion and dispersion slope will end up becoming small in absolute value, or non-linearity or transmission loss will end up occurring.

As the RDF (negative fiber) of the present embodiment, it is possible to use for example the RDF shown below.

Figure 4A:
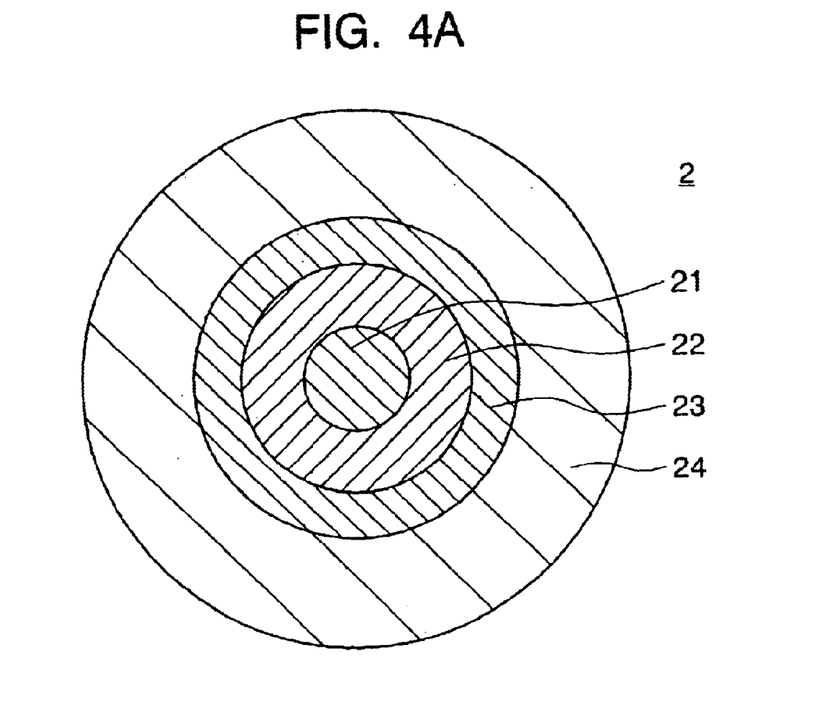
FIG. 4A is a cross sectional view of a line use dispersion compensation optical fiber having a negative dispersion and a negative dispersion slope in the 1.5 μm band.

FIG. 4A is a sectional view of a line use dispersion compensation fiber RDF (2) having a negative dispersion and a negative dispersion slope in the 1.5 $\mu m$ band. This is structured as a W-type plus the addition of one side core.

A first side core 22 and second side core 23 are formed around the outer circumference of the center core 21 and a cladding 24 is formed around the outer circumference of the side cores.

Figure 4B:
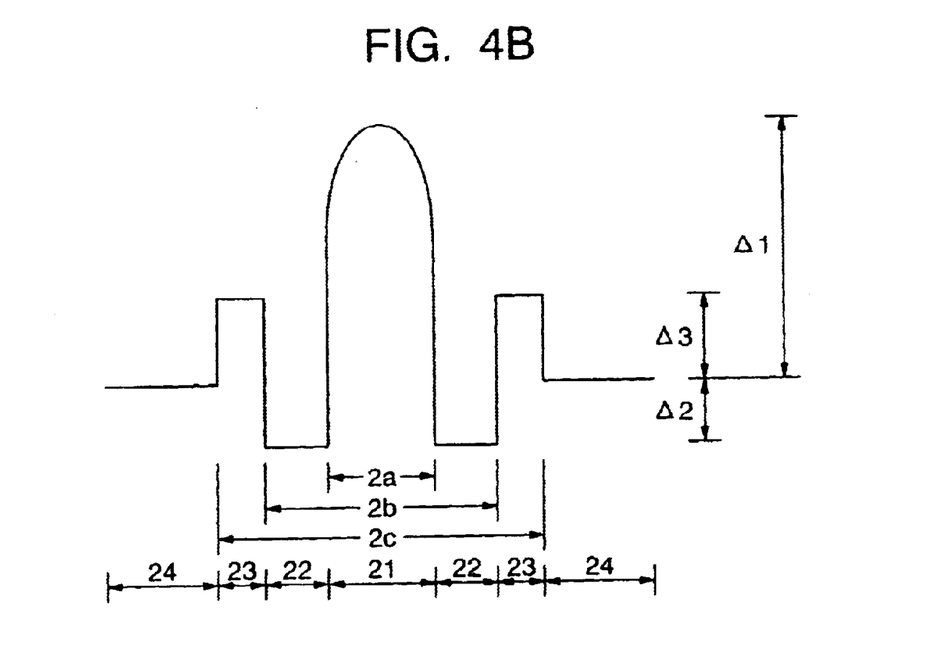
FIG. 4B is a refractive index profile corresponding to the above parts.

FIG. 4B is a refractive index profile corresponding to the above parts.

The center core 21 has a relative refractive index Δ1 with respect to the cladding 24, while the first side core 22 and the second side core 33 have relative refractive indexes Δ2 and Δ3 with respect to the cladding 24.

Here, the parameter α for the approximation by the above formula (4) of the refractive index profile (n(r)) of the center core and the distance r from the center of the optical fiber, the diameter 2a of the center core 21, the diameter 2b of the first side core 22, the diameter 2c of the second side core 23, and the effective core area ($A_{eff}$) are set as follows:

In the above RDF, to obtain a large absolute value of dispersion of not more than −40 ps/nm/km while maintaining a low transmission loss, the Δ1 is set to 1.2% to 1.5%.

A small Δ1 is effective not only for reducing the transmission loss, but also improving the PMD characteristic and non-linear characteristic.

If too small, however, the absolute value of the dispersion ends up becoming small, so the above range was decided on.

Under the above conditions, while maintaining the bending loss at a diameter of 20 mm at not more than 5 db/m, the values of α, Δ2, Δ3, and a:b:c are adjusted so that the dispersion per slope (DPS) in the 1.55 μm band becomes not more than 300 nm and the $A_{eff}$ becomes a value larger than that of a conventional DCF, that is, at least 20 $\mu m^2$.

For example, α is preferably made 2 to 5. If less than 2, the bending loss increases, while if more than 5, the compensation rate ends up becoming worse.

Further, Δ2 is preferably made −0.50 to −0.35%. If less than −0.50%, the bending loss increases, while if more than −0.35%, the compensation rate ends up becoming worse.

Further, Δ3 is preferably made 0.15 to 0.30%. If less than 0.15%, the bending loss increases, while if more than 0.30%, the DPS also becomes a large one of at least 300 nm and the cutoff wavelength also ends up increasing.

It is preferable that a:b:c be made 1:1.7 to 2.0:2.4 to 3.0. When a=1, if b is less than 1.7, the compensation rate falls, while if more than 2.0, bending loss occurs. Further, when a=1, if c is less than 2.4, the bending loss increases, while if more than 3.0, the cutoff wavelength and DPS increase.

If in the above range, it is possible to obtain an RDF (negative fiber) having a dispersion of not more than −40 ps/nm/km, a DPS of not more than 300 nm, an $A_{eff}$ of not less than 20 $\mu m^2$, and a bending loss of not more than 5 dB/m.

In the above structure, the transmission loss is preferably not more than 0.50 dB/km, more preferably not more than 0.27 dB/km.

According to the dispersion management optical transmission system of the present embodiment, it is possible to achieve low non-linearity (suppress FWM or SPM, XPM, etc.), dispersion flatness, and low bending loss characteristics at the same time as low loss characteristics.

The characteristics of the dispersion management optical transmission system of the present embodiment of low loss characteristics, low non-linearity, low bending loss, and low dispersion slope are optimal for a WDM transmission line.

Using a dispersion management optical transmission system of the present embodiment, it is possible to easily prepare an optical transmission system suitable for high speed, large capacity transmission.

EXAMPLE 1

First, positive fibers of Sample Nos. 1 to 4 were prepared using as a base structure a positive fiber having a step-type refractive index profile as shown in FIG. 2 wherein Δ1=0.40%, α=4, Δ2=0.20%, and Ra=0.45. The values of the Δ, Ra, etc. however were finely adjusted for each fiber so as not to cause deterioration of the bending loss.

The core diameters, loss, dispersion, dispersion slope, dispersion per slope (DPS), mode field diameter (MFD), effective core area ($A_{eff}$), cutoff wavelength (λc), bending loss at a diameter of 20 mm (20φ bending), and polarized mode dispersion (PMD) of the positive fibers are shown in Table 1.

TABLE 1

Results of Trial Production of Positive Fibers

| No. | Core dia. (μm) | Loss (dB/km) | Dispersion (ps/nm/km) | Dispersion slope (ps/nm²km) | DPS (nm) | MFD (μm) | $A_{eff}$ ($\mu m^2$) | λc (nm) | 20φ bending (dB/m) | PMD (ps/√km) |
|---|---|---|---|---|---|---|---|---|---|---|
| 1 | 19.0 | 0.196 | 14.7 | 0.067 | 219 | 11.2 | 101 | 1455 | 4.0 | 0.04 |
| 2 | 18.5 | 0.194 | 13.0 | 0.065 | 200 | 11.0 | 96 | 1425 | 4.5 | 0.05 |
| 3 | 16.0 | 0.197 | 10.9 | 0.064 | 186 | 10.8 | 91 | 1362 | 5.0 | 0.04 |
| 4 | 15.0 | 0.187 | 9.2 | 0.062 | 148 | 9.6 | 72 | 1315 | 4.0 | 0.04 |

As shown in Table 1, the positive fibers of Sample Nos. 1 to 4 all had transmission losses of not more than 0.20 dB/km or all good values.

The positive fibers of Sample Nos. 1 to 3 had $A_{eff}$ values larger than that of a conventional SMF, that is, at least 90 $\mu m^2$. Further, the positive fiber of Sample No. 4 also had one of over 70 $\mu m^2$ or an enlarged $A_{eff}$ value.

The bending loss, PMD, and other characteristics were also good.

As shown in Table 1, reduction of the dispersion leads to reduction of the DPS. That is, even if the dispersion becomes smaller, the dispersion slope cannot be made that small, so the DPS becomes too small and dispersion compensation becomes difficult.

Therefore, reducing the dispersion to less than 8 ps/nm/km is not desirable in that it creates problems in terms of the dispersion compensation.

EXAMPLE 2

First, negative fibers having the W-type structure shown in FIG. 4 plus a further side core layer were prepared as Sample Nos. 1 and 2.

The core diameters, Δ1, loss, dispersion, dispersion slope, dispersion per slope (DPS), effective core area ($A_{eff}$), cutoff wavelength (λc), bending loss at a diameter of 20 mm (20φ bending), and polarization mode dispersion (PMD) of the negative fibers are shown in Table 2.

TABLE 1

Results of Trail Production of Negative Fibers

| No. | Core dia. ($\mu$m) | $\Delta 1$ (%) | Loss (dB/km) | Dispersion (ps/nm/km) | Dispersion slope (ps/nm²km) | DPS (nm) | $A_{eff}$ ($\mu$m²) | $\lambda c$ (nm) | 20φ bending (dB/m) | PMD (ps/√km) |
|---|---|---|---|---|---|---|---|---|---|---|
| 1 | 14.0 | 1.25 | 0.260 | −59.3 | −2.14 | 277 | 24.5 | 1418 | 3 | 0.08 |
| 2 | 10.5 | 1.45 | 0.285 | −80.2 | −2.85 | 281 | 20.4 | 1456 | 3 | 0.09 |

As shown in Table 2, a low loss characteristic is obtained by keeping the bending loss of the negative fiber to a small value. The DPS is also a small one of not more than 300 nm, so dispersion flatness of the line as a whole can also be expected.

Further, since the dispersion obtained is also an extremely large value, the length of the positive fiber can be set to at least four times the length of the negative fiber of the present embodiment.

Due to this, it is possible to achieve even lower non-linear characteristics and lower loss characteristics in the total line obtained by combining the positive fiber and negative fiber. Further, the $A_{eff}$ is also at least 20 $\mu$m² or a large value compared with a conventional DCF.

EXAMPLE 3

The overall characteristics of optical transmission systems combining positive fibers of Table 1 and negative fibers of Table 2 were investigated.

The results are shown in Table 3.

The numbers of the positive fibers and negative fibers correspond to the sample numbers shown in Table 1 and Table 2. For example, "Pos.1+Neg.1" is an optical transmission system combining a positive fiber of Sample No. 1 in Table 1 and a negative fiber of Sample No. 2 in Table 2.

Optical transmission systems of eight combinations were examined as to their connection ratio, loss, dispersion, dispersion slope, and polarization mode dispersion (PMD).

TABLE 3

Total Characteristics of Lines as a Whole

| No. | Connection ratio | Loss (dB/km) | Dispersion (ps/nm/km) | Dispersion slope (ps/nm²/km) | PMD (ps/√km) |
|---|---|---|---|---|---|
| Pos. 1 + Neg. 1 | 4.0:1 | 0.209 | 0 | 0.011 | 0.05 |
| Pos. 1 + Neg. 2 | 5.5:1 | 0.206 | 0 | 0.012 | 0.05 |
| Pos. 2 + Neg. 1 | 4.6:1 | 0.206 | 0 | 0.015 | 0.06 |
| Pos. 2 + Neg. 2 | 6.2:1 | 0.203 | 0 | 0.016 | 0.06 |
| Pos. 3 + Neg. 1 | 5.4:1 | 0.207 | 0 | 0.021 | 0.05 |
| Pos. 3 + Neg. 2 | 7.4:1 | 0.204 | 0 | 0.022 | 0.05 |
| Pos. 4 + Neg. 1 | 6.5:1 | 0.197 | 0 | 0.025 | 0.05 |
| Pos. 4 + Neg. 2 | 8.7:1 | 0.197 | 0 | 0.026 | 0.05 |

As seen above, the result was obtained that a low dispersion can be obtained in a broad range of wavelength when connecting positive fibers and negative fibers in a ratio of 4 or more to 1.

The dispersion slope was suppressed to not more than 0.030 ps/nm²/km. The smallest one was about 0.010 ps/nm²/km.

Further, the transmission loss was kept to a low level of not more than 0.21 dB/km, while the PMD was a low value of not more than 0.1 ps/√km in all fibers no matter what the combination.

While the invention has been described with reference to specific embodiments chosen for purpose of illustration, it should be apparent that numerous modifications could be made thereto by those skilled in the art without departing from the basic concept and scope of the invention.

For example, the SMF (positive fiber) and RDF (negative fiber) may have structures other than those explained in the embodiment.

Summarizing the effects of the invention, according to the present invention, it is possible to provide a dispersion management optical transmission system obtained by connecting an optical fiber having a positive dispersion and a positive dispersion slope in the 1.5 $\mu$m band and an optical fiber having a negative dispersion and a negative dispersion slope in the 1.5 $\mu$m band so as to suppress dispersion in the 1.5 $\mu$m band, wherein the occurrence of non-linear phenomena is suppressed and the transmission loss is reduced, and an optical transmission line using the same.

By using this dispersion management optical transmission system or an optical transmission line using the same for transmission on the sea floor or on the ground, it is possible to transmit signals stably at a higher speed in a larger capacity.

What is claimed is:

1. A dispersion management optical transmission system comprising
    a first optical fiber having a positive dispersion and a positive dispersion slope in the 1.5 $\mu$m band and
    a second optical fiber or a second optical fiber module connected to a rear side of the first optical fiber and having a negative dispersion and a negative dispersion slope in the 1.5 $\mu$m band,
    the dispersion of the first optical fiber in the 1.55 $\mu$m band being 8 to 15 ps/nm/km and the dispersion slope being at least 0.04 ps/nm²/km,
    the dispersion of the second optical fiber or the second optical fiber module in the 1.55 $\mu$m band being not more than −40 ps/nm/km and the dispersion slope being not more than −0.08 ps/nm²/km,
    the cumulative dispersion of the first optical fiber being at least 200 ps/nm, and
    the cumulative dispersion when combining the first optical fiber and the second optical fiber or second optical fiber module being suppressed in any wavelength region of the 1.5 $\mu$m band.

2. A dispersion management optical transmission system as set forth in claim 1, wherein the average dispersion when combining the first optical fiber and the second optical fiber or second optical fiber module is within ±3 ps/nm/km in any wavelength region of the 1.5 $\mu$m band.

3. A dispersion management optical transmission system as set forth in claim 1 or 2, wherein the length of the first optical fiber is at least four times the length of the second optical fiber or the second optical fiber module.

4. A dispersion management optical transmission system as set forth in any one of claims 1 to 3, wherein
   a transmission loss of the first optical fiber in the 1.55 μm band is not more than 0.21 dB/km,
   a transmission loss of the second optical fiber or the second optical fiber module in the 1.55 μm band is not more than 0.50 dB/km, and
   a total transmission loss in the 1.55 μm band when combining the first optical fiber and the second optical fiber or second optical fiber module, excluding a connection loss, is not more than 0.300 dB/km.

5. A dispersion management optical transmission system as set forth in any one of claims 1 to 3, wherein
   a transmission loss of the first optical fiber in the 1.55 μm band is not more than 0.20 dB/km,
   a transmission loss of the second optical fiber or the second optical fiber module in the 1.55 μm band is not more than 0.27 dB/km, and
   a total transmission loss in the 1.55 μm band when combining the first optical fiber and the second optical fiber or second optical fiber module, excluding a connection loss, is not more than 0.215 dB/km.

6. A dispersion management optical transmission system as set forth in any one of claims 1 to 5, wherein the dispersion slope in the 1.55 μm band when combining the first optical fiber and the second optical fiber or second optical fiber module is −0.030 to 0.030 ps/nm²/km.

7. A dispersion management optical transmission system as set forth in any one of claims 1 to 6, wherein the effective core area ($A_{eff}$) of the first optical fiber is at least 70 μm².

8. A dispersion management optical transmission system as set forth in any one of claims 1 to 6, wherein the effective core area ($A_{eff}$) of the first optical fiber is at least 90 μm².

9. A dispersion management optical transmission system as set forth in any one of claims 1 to 8, wherein the effective core area ($A_{eff}$) of the second optical fiber or second optical fiber module is at least 20 μm².

10. A dispersion management optical transmission system as set forth in any one of claims 1 to 9, wherein the bending loss at a diameter of 20 mm of the second optical fiber or second optical fiber module in the 1.55 μm band is not more than 5 dB/m.

11. A dispersion management optical transmission system as set forth in any one of claims 1 to 10, wherein
   said first optical fiber is configured having a core and a cladding,
   said core having
      a center core having a refractive index higher than said cladding and
      a side core formed around the outer circumference of the center core and having a refractive index between the refractive index of said center core and the refractive index of said cladding.

12. A dispersion management optical transmission system as set forth in any one of claims 1 to 11, wherein
   said second optical fiber or second optical fiber module is configured having a core and a cladding,
   said core having
      a center core having a refractive index higher than the refractive index of said cladding,
      a first side core formed around the outer circumference of the center core and having a refractive index lower than the refractive index of said cladding, and
      a second side core formed around the outer circumference of the first side core and having a refractive index higher than the refractive index of said cladding.

13. A dispersion management optical transmission system as set forth in claim 12, wherein, in said second optical fiber or second optical fiber module,
   a relative refractive index difference (Δ1) of said center core with respect to said cladding is 1.2 to 1.5%,
   a value α at the time of approximation by the following formula for a refractive index profile (n(r)) of said center core and a distance r from the center of the optical fiber being 2 to 5, $$n(r) \propto \left\{1 - 2\Delta\left(\frac{r}{a}\right)^\alpha\right\}$$

where, a is the center core radius and
   Δ is $(n_1-n_2)/n_1$ ($n_1$ is the maximum refractive index of the center core, while $n_2$ is the refractive index of the cladding)
   a relative refractive index difference (Δ2) of said first side core with respect to said cladding is −0.50 to −0.35%,
   a relative refractive index difference (Δ3) of said second side core with respect to said cladding is 0.15 to 0.30%, and
   a ratio of the center core radius (a): first side core radius (b): second side core radius (c) is 1:1.7 to 2.0:2.4 to 3.0.

14. An optical transmission line provided with at least one dispersion management optical transmission system as set forth in any one of claims 1 to 13.

15. An optical transmission line provided with a plurality of dispersion management optical transmission systems as set forth in any one of claims 1 to 13 arranged in parallel.

* * * * *